US012584415B2

(12) United States Patent
Mathew et al.

(10) Patent No.: US 12,584,415 B2
(45) Date of Patent: Mar. 24, 2026

(54) TURBINE ENGINE SEAL FOR TURBINE ENGINES

(71) Applicant: General Electric Company, Evendale, OH (US)

(72) Inventors: Paul Mathew, Bengaluru (IN); Ravindra Shankar Ganiger, Bengaluru (IN); David Raju Yamarthi, Bengaluru (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/186,813

(22) Filed: Apr. 23, 2025

(65) Prior Publication Data

US 2025/0341169 A1 Nov. 6, 2025

(30) Foreign Application Priority Data

May 3, 2024 (IN) ............................. 202411035177

(51) Int. Cl.
*F01D 11/00* (2006.01)

(52) U.S. Cl.
CPC ........ *F01D 11/001* (2013.01); *F05D 2250/75* (2013.01); *F05D 2300/5021* (2013.01)

(58) Field of Classification Search
CPC ..................................................... F01D 11/001
See application file for complete search history.

(56) References Cited

U.S. PATENT DOCUMENTS 4,060,250 A 11/1977 Davis et al.
4,093,243 A 6/1978 Kishida et al.
5,100,158 A 3/1992 Gardner
5,143,384 A 9/1992 Lipschitz
5,236,788 A 8/1993 Manier et al.
(Continued)

FOREIGN PATENT DOCUMENTS

FR 3059041 B1 5/2020

OTHER PUBLICATIONS

Grondahl et al., Film Riding Leaf Seals for Improved Shaft Sealing, GT2010-23629, Proceeding of ASME Turbo Expo 2010: Power for Land, Sea and Air, Jun. 2010, Glasgow, UK, 8 Pages.
(Continued)

*Primary Examiner* — Brian O Peters
(74) *Attorney, Agent, or Firm* — Dority & Manning, P.A.

(57) ABSTRACT

A turbine engine seal configured for use between a turbine engine rotor and a turbine engine static component of a turbine engine can include a seal construction having a negative thermal expansion (NTE) layer located on one or both of the turbine engine rotor and turbine engine static component. The NTE layer can include a NTE reactive component comprising a material with a negative thermal expansion coefficient. When the turbine engine rotor rubs against the turbine engine static component, heat is generated and the NTE reactive component can experience an increase in temperature from a first temperature to a second temperature. The increase in temperature causes a dimension of the NTE reactive component to decrease which consequently forms a hydrodynamic pocket useful to generate a lift force that urges separation between the turbine engine rotor and turbine engine static component. The seal construction can include a lattice compliant layer.

19 Claims, 10 Drawing Sheets

(56) References Cited

U.S. PATENT DOCUMENTS

| | | | |
|---|---|---|---|
| 5,301,957 | A | 4/1994 | Hwang et al. |
| 5,509,664 | A | 4/1996 | Borkiewicz |
| 5,609,469 | A | 3/1997 | Worley et al. |
| 6,145,843 | A | 11/2000 | Hwang |
| 6,505,837 | B1 | 1/2003 | Heshmat |
| 6,572,115 | B1 | 6/2003 | Sarshar et al. |
| 6,655,696 | B1 | 12/2003 | Fang et al. |
| 6,692,006 | B2 | 2/2004 | Holder |
| 6,811,154 | B2 | 11/2004 | Proctor et al. |
| 6,887,528 | B2 | 5/2005 | Lau et al. |
| 7,334,980 | B2 | 2/2008 | Trinks et al. |
| 7,726,660 | B2 | 6/2010 | Datta |
| 7,918,460 | B2 | 4/2011 | Ochiai et al. |
| 8,002,285 | B2 | 8/2011 | Justak |
| 8,056,902 | B2 | 11/2011 | Roddis et al. |
| 8,641,045 | B2 | 2/2014 | Justak |
| 8,888,446 | B2 | 11/2014 | Ali et al. |
| 9,045,994 | B2 | 6/2015 | Bidkar et al. |
| 9,115,810 | B2 | 8/2015 | Bidkar et al. |
| 9,145,785 | B2 | 9/2015 | Bidkar et al. |
| 9,255,642 | B2 | 2/2016 | Bidkar et al. |
| 9,359,908 | B2 | 6/2016 | Bidkar et al. |
| 9,587,746 | B2 | 3/2017 | Bidkar et al. |
| 9,790,809 | B2 | 10/2017 | Dube et al. |
| 9,890,650 | B2 | 2/2018 | Von Berg et al. |
| 10,060,280 | B2 | 8/2018 | Crawley, Jr. et al. |
| 10,161,259 | B2 | 12/2018 | Gibson et al. |
| 10,190,431 | B2 | 1/2019 | Bidkar et al. |
| 10,352,455 | B2 | 7/2019 | Berard et al. |
| 10,443,424 | B2 | 10/2019 | McCaffrey |
| 11,724,969 | B2 | 8/2023 | Hafner et al. |
| 11,821,320 | B2 | 11/2023 | Johnson et al. |
| 2007/0053772 | A1 | 3/2007 | Couture, Jr. et al. |
| 2008/0056895 | A1 | 3/2008 | Senoo |
| 2012/0223483 | A1 | 9/2012 | Bidkar et al. |
| 2013/0154192 | A1 | 6/2013 | Sitko et al. |
| 2014/0008871 | A1 | 1/2014 | Bidkar et al. |
| 2014/0062024 | A1 | 3/2014 | Bidkar et al. |
| 2015/0159498 | A1 | 6/2015 | Mukhopadhyay et al. |
| 2016/0010480 | A1 | 1/2016 | Bidkar et al. |
| 2016/0097291 | A1 | 4/2016 | Hayford et al. |
| 2016/0130963 | A1 | 5/2016 | Wilson et al. |
| 2016/0138412 | A1 | 5/2016 | Rioux |
| 2016/0376907 | A1 | 12/2016 | O'Leary et al. |
| 2017/0051621 | A1 | 2/2017 | Ackermann et al. |
| 2018/0372229 | A1 | 12/2018 | Bidkar et al. |
| 2019/0072186 | A1 | 3/2019 | Bidkar et al. |
| 2019/0085712 | A1 | 3/2019 | Wesling et al. |
| 2019/0203842 | A1 | 7/2019 | Bidkar et al. |
| 2020/0040735 | A1 | 2/2020 | Millier et al. |
| 2020/0063588 | A1 | 2/2020 | Morliere et al. |
| 2020/0318489 | A1 | 10/2020 | Webb |
| 2021/0207487 | A1 | 7/2021 | George et al. |
| 2022/0235667 | A1 | 7/2022 | Mizumi et al. |
| 2023/0133675 | A1 | 5/2023 | Brown et al. |
| 2023/0142146 | A1* | 5/2023 | Kilchyk ................ F03G 7/0612 428/218 |
| 2023/0279780 | A1* | 9/2023 | Trivedi ................ B22F 3/1115 277/412 |
| 2024/0035390 | A1 | 2/2024 | Johnson et al. |

OTHER PUBLICATIONS

Lind, Two Decades of Negative Thermal Expansion Research: Where Do We Stand?, Materials (Basel), vol. 5, Issue 6, 2012, 1125-1154. https://doi.org/10.3390/ma5061125.

Munson et al., Development of Film Riding Face Seals for a Gas Turbine Engine, Tribology Transactions, vol. 35, Issue 1, 1992, 65-70. https://doi.org/10.1080/10402009208982090 (Abstract Only).

Steinetz et al., Advanced Seal Technology Role in Meeting Next Generation Turbine Engine Goals, NASA Design Principles and Methods for Aircraft Gas Turbine Engines, 1998, 14 pages. https://ntrs.nasa.gov/citations/20000020798 (Abstract Only).

* cited by examiner

TURBINE ENGINE SEAL FOR TURBINE ENGINES

PRIORITY INFORMATION

The present application claims priority to Indian Provisional Patent Application Ser. No. 202411035177 filed on May 3, 2024.

FIELD

The present disclosure generally pertains to seal assemblies for rotary machines, and more particularly, to seals for rotary machines such as turbine engines, as well as methods of manufacturing seal assemblies and methods of encouraging separation between a turbine engine rotor and turbine engine static component.

BACKGROUND

Rotary machines such as gas turbine engines have seals between rotating components (e.g., rotors) and corresponding stationary components (e.g., stators). These seals help to reduce leakage of fluids between the rotors and stators. Transient operating conditions and/or aberrant movements of the rotor may result in leakage of the seal. Excessive leakage of a seal in a rotary machine can significantly reduce the operating efficiency of the rotary machine. Transient operating conditions and/or aberrant movements of the rotor may also result in increased friction and/or contact between the seal and the rotor. Such friction and/or contact between the seal and the rotor may result in premature wear and/or reduced operating efficiency of the rotary machine. Accordingly, it would be welcomed in the art to provide improved seal assemblies for rotary machines such as turbine engines, as well as improved methods of sealing an interface between a rotor and a stator of a rotary machine.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 4B shows a schematic view of an exemplary seal construction of a seal assembly at a second temperature;

Figure 1:
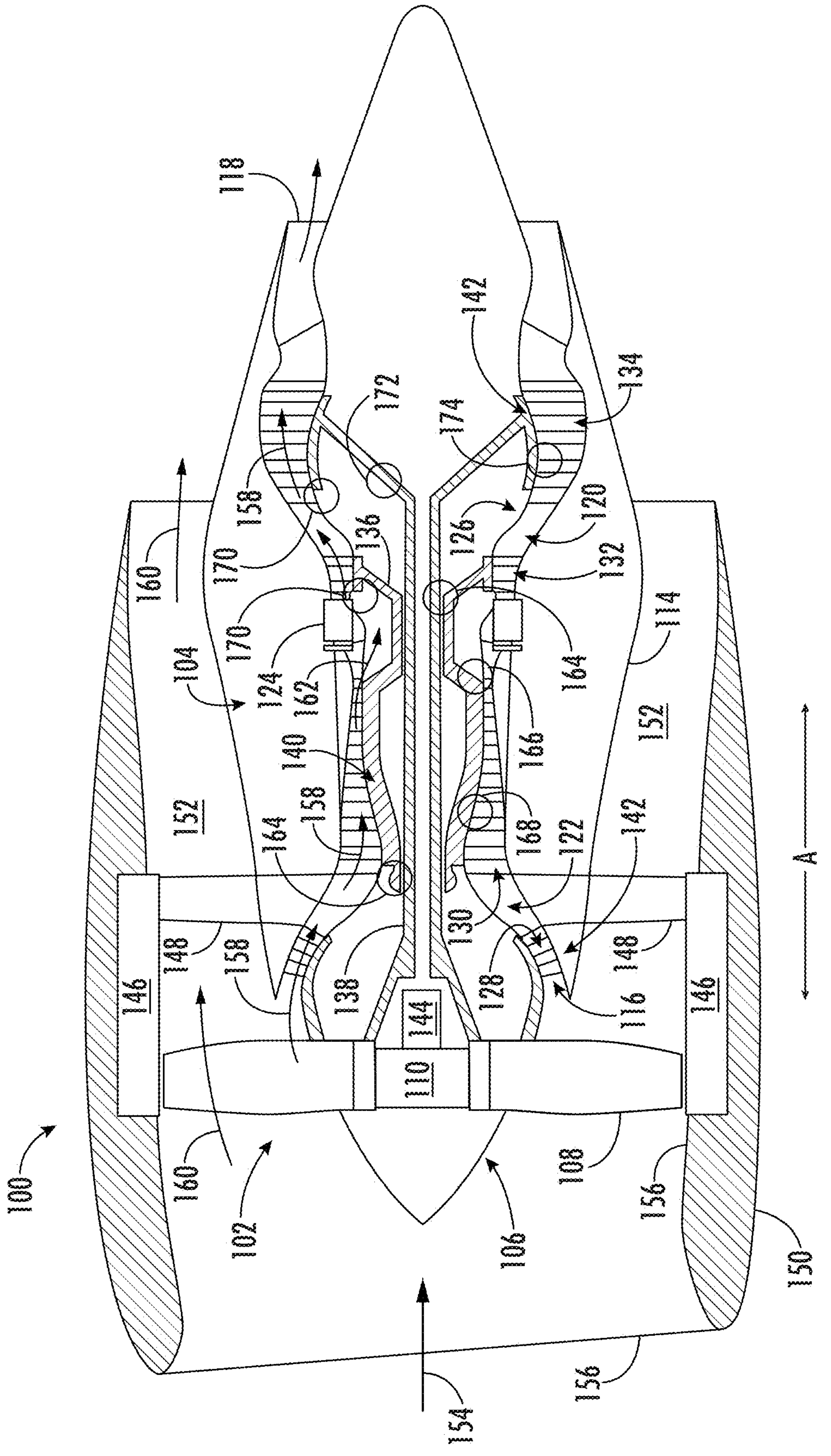
FIG. 1 shows a schematic cross-sectional view of an exemplary turbine engine.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

The terms “upper”, “lower”, “right”, “left”, “vertical”, “horizontal”, “top”, “bottom”, “lateral”, “longitudinal”, and so forth, shall relate to the disclosure as it is oriented in the drawing figures. However, it is to be understood that the disclosure may assume various alternative orientations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The terms “forward” and “aft” refer to relative positions within a turbine engine, with forward referring to a position closer to an engine inlet and aft referring to a position closer to an engine nozzle or exhaust.

The terms “upstream” and “downstream” refer to the relative direction with respect to fluid flow in a fluid pathway. For example, “upstream” refers to the direction from which the fluid flows, and “downstream” refers to the direction to which the fluid flows.

The singular forms “a”, “an”, and “the” include plural references unless the context clearly dictates otherwise.

The terms “coupled,” “fixed,” “attached to,” and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section 126, and a "high-pressure turbine" may refer to the highest maximum pressure turbine within the turbine section 126.

The term "turbomachine" or "turbomachinery" refers to a machine including one or more compressors, a heat generating section (e.g., a combustor section), and one or more turbines that together generate a torque output.

As used herein, the term "turbine engine" refers to an engine that includes a turbomachine as all or a portion of its power source. Example turbine engines include gas turbine engines, as well as hybrid-electric turbine engines, such as turbofan engines, turboprop engines, turbojet engines, turboshaft engines, and the like.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be stationary or may rotate about an axis of rotation. A stator may be disposed radially inward or radially outward along a radial axis in relation to a rotor.

One or more components of the turbomachine engine described herein below may be manufactured or formed using any suitable process, such as an additive manufacturing process (e.g., a 3-D printing process). The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing technologies in accordance with the present disclosure include, for example, Selective Laser Melting (SLM), Direct Metal Laser Melting (DMLM), Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), and other known processes.

Suitable powder materials for the manufacture of the structures provided herein as integral, unitary, structures include metallic alloy, polymer, or ceramic powders. Exemplary metallic powder materials are stainless-steel alloys, cobalt-chrome alloys, aluminum alloys, titanium alloys, nickel-based superalloys, and cobalt-based superalloys. In addition, suitable alloys may include those that have been engineered to have good oxidation resistance, known as "superalloys" which have acceptable strength at the elevated temperatures of operation in a turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X 45, PWA 1483 and CM SX (e.g. CM SX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure generally provides seal assemblies for rotary machines. The presently disclosed seal assemblies may be utilized in any rotary machine. Exemplary embodiments may be particularly suitable for turbomachines, such as turbine engines, and the like. The presently disclosed seal assemblies include film-riding seals that provide a thin film of fluid between a face of the seal and a face of the rotor. The seal assemblies can be located at an interface between a turbine engine rotor and a turbine engine static component. The seal assembly can include a seal construction.

The presently disclosed seal assemblies are generally considered non-contacting seals, in that the fluid bearing inhibits contact between the seal face and the rotor face. Additionally, the presently disclosed seal assemblies include a seal construction configured to float or actuate along a motion axis in response to motive forces caused by transient operating conditions of the rotary machine and/or aberrant movement of the rotor. The construction includes features described herein that provide for improved responsiveness to transient operating conditions and/or aberrant movement of the rotor. The presently disclosed seal constructions may accommodate a wider range of operating conditions and/or may provide improved operating performance, including improved performance of the seal assembly and/or improved performance of the rotary machine. Additionally, or in the alternative, the presently disclosed seal assemblies may provide for a lower likelihood of continuous contact between turbine engine rotor and turbine engine static component during transient conditions, thereby enhancing the durability and/or useful life of the seal assembly, turbine engine rotor, turbine engine static component, and/or related components of the rotary machine.

Exemplary embodiments of the present disclosure will now be described in further detail. Referring to FIG. 1, an exemplary turbine engine 100 will be described. In some embodiments, the presently disclosed seal assemblies may be included in a rotary machine such as a turbine engine 100. An exemplary turbine engine 100 may be mounted to an aircraft, such as in an under-wing configuration or tail-mounted configuration. It will be appreciated that the turbine engine 100 shown in FIG. 1 is provided by way of example and is not to be limiting, and that the subject matter of the present disclosure may be implemented with other types of turbine engines, as well as other types of rotary machines.

In general, a turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The fan blades 108 may extend outwardly from the fan disk 110 generally along a radial direction. The core engine 104 may be coupled directly or indirectly to the fan section 102 to provide torque for driving the fan section 102.

The core engine 104 may include an engine case 114 that encases one or more portions of the core engine 104, including, a compressor section 122, a combustor section 124, and a turbine section 126. The engine case 114 may define a core engine-inlet 116, an exhaust nozzle 118, and a core air flowpath 120 therebetween. The core air flowpath 120 may pass through the compressor section 122, the combustor section 124, and the turbine section 126, in serial flow relationship. The compressor section 122 may include a first, booster or low pressure (LP) compressor 128 and a second, high pressure (HP) compressor 130. The turbine section 126 may include a first, high pressure (HP) turbine 132 and a second, low pressure (LP) turbine 134. The compressor section 122, combustor section 124, turbine section 126, and exhaust nozzle 118 may be arranged in serial flow relationship and may respectively define a portion of the core air flowpath 120 through the core engine 104.

The core engine 104 and the fan section 102 may be coupled to a shaft driven by the core engine 104. By way of example, as shown in FIG. 1, the core engine 104 may include a high pressure (HP) shaft 136 and a low pressure (LP) shaft 138. The HP shaft 136 may drivingly connect the HP turbine 132 to the HP compressor 130. The LP shaft 138 may drivingly connect the LP turbine 134 to the LP compressor 128. In other embodiments, a turbine engine 100 may have three shafts, such as in the case of a turbine engine 100 that includes an intermediate pressure turbine. A shaft of the core engine 104, together with a rotating portion of the core engine 104, may sometimes be referred to as a "spool." The HP shaft 136, a rotating portion of the HP compressor 130 coupled to the HP shaft 136, and a rotating portion of the HP turbine 132 coupled to the HP shaft 136, may be collectively referred to as a high pressure (HP) spool 140. The LP shaft 138, a rotating portion of the LP compressor 128 coupled to the LP shaft 138, a rotating portion of the L P turbine 134 coupled to the LP shaft 138, may be collectively referred to as low pressure (LP) spool 142.

In some embodiments, the fan section 102 may be coupled directly to a shaft of the core engine 104, such as directly to an LP shaft 138. Alternatively, as shown in FIG. 1, the fan section 102 and the core engine 104 may be coupled to one another by way of a power gearbox 144, such as a planetary reduction gearbox, an epicyclical gearbox, or the like. For example, the power gearbox 144 may couple the LP shaft 138 to the fan 106, such as to the fan disk 110 of the fan section 102. The power gearbox 144 may include a plurality of gears for stepping down the rotational speed of the LP shaft 138 to a more efficient rotational speed for the fan section 102.

Still referring to FIG. 1, the fan section 102 of the turbine engine 100 may include a fan case 146 that at least partially surrounds the fan 106 and/or the plurality of fan blades 108. The fan case 146 may be supported by the core engine 104, for example, by a plurality of outlet guide vanes 148 circumferentially spaced and extending substantially radially therebetween. The turbine engine 100 may include a nacelle 150. The nacelle 150 may be secured to the fan case 146. The nacelle 150 may include one or more sections that at least partially surround the fan section 102, the fan case 146, and/or the core engine 104. For example, the nacelle 150 may include a nose cowl, a fan cowl, an engine cowl, a thrust reverser, and so forth. The fan case 146 and/or an inward portion of the nacelle 150 may circumferentially surround an outer portion of the core engine 104. The fan case 146 and/or the inward portion of the nacelle 150 may define a bypass passage 152. The bypass passage 152 may be disposed annularly between an outer portion of the core engine 104 and the fan case 146 and/or inward portion of the nacelle 150 surrounding the outer portion of the core engine 104.

During operation of the turbine engine 100, an inlet airflow 154 enters the turbine engine 100 through an inlet 156 defined by the nacelle 150, such as a nose cowl of the nacelle 150. The inlet airflow 154 passes across the fan blades 108. The inlet airflow 154 splits into a core airflow 158 that flows into and through the core air flowpath 120 of the core engine 104 and a bypass airflow 160 that flow through the bypass passage 152. The core airflow 158 is compressed by the compressor section 122. Pressurized air from the compressor section 122 flows downstream to the combustor section 124 where fuel is introduced to generate combustion gas, as represented by arrow 162. The combustion gas exit the combustor section 124 and flow through the turbine section 126, generating torque that rotates the compressor section 122 to support combustion while also rotating the fan section 102. Rotation of the fan section 102 causes the bypass airflow 160 to flow through the bypass passage 152, generating propulsive thrust. Additional thrust is generated by the core airflow exiting the exhaust nozzle 118.

In some exemplary embodiments, the turbine engine 100 may be a relatively large power class turbine engine 100 that may generate a relatively large amount of thrust. For example, the turbine engine 100 may be configured to generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, it will be appreciated that the various features and attributes of the turbine engine 100 described with reference to FIG. 1 are provided by way of example only and not to be limiting. In fact, the present disclosure may be implemented with respect to any desired turbine engine, including those with attributes or features that differ in one or more respects from the turbine engine 100 described herein.

Still referring to FIG. 1, the turbine engine 100 includes seal assemblies at a number of locations throughout the turbine engine 100, any one or more of which may be configured according to the present disclosure. A presently disclosed seal assembly may be provided in a turbine engine 100 at any location that includes an interface with a rotating portion of the turbine engine 100, such as an interface with a rotating portion or spool of the core engine 104. For example, a seal assembly may be included at an interface with a portion of the LP spool 142 and/or at an interface with the HP spool 140. In some embodiments, a seal assembly may be included at an interface between a spool, such as the LP spool 142 or the HP spool 140, a stationary portion of the core engine 104. Additionally, or in the alternative, a seal assembly may be included at an interface between the LP spool 142 and the HP spool 140. Additionally, or in the alternative, a seal assembly may be included at an interface between a stationary portion of the core engine 104 and the LP shaft 138 or the HP shaft 136, and/or at an interface between the LP shaft 138 and the HP shaft 136.

By way of example, FIG. 1 shows some exemplary locations of a seal assembly. As one example, a seal assembly may be located at or near a bearing compartment 164. A seal assembly located at or near a bearing compartment 164 may sometimes be referred to as a bearing compartment seal. Such a bearing compartment seal may be configured to inhibit air flow, such as core airflow 158 from passing into a bearing compartment of the turbine engine 100, such as a bearing compartment located at an interface between the LP shaft 138 and the HP shaft 136. As another example, a seal assembly may be located at or near the compressor section 122 of the turbine engine 100. In some embodiments, a seal assembly may be located at or near a compressor discharge 166, for example, of the HP compressor 130. A seal assembly located at or near a compressor discharge 166 may sometimes be referred to as a compressor discharge pressure seal. Such a compressor discharge pressure seal may be configured to maintain pressure downstream of the compressor section 122 and/or to provide bearing thrust balance. Additionally, or in the alternative, a seal assembly may be located between adjacent compressor stages 168 of the compressor section 122. A seal assembly located between adjacent compressor stages 168 may be sometimes referred to as a compressor interstage seal. Such a compressor interstage seal may be configured to limit air recirculation within the compressor section 122. As another example, a seal assembly may be located at or near the turbine section 126 of the turbine engine 100. In some embodiments, a seal assembly may be located at or near a turbine inlet 170, for example, of the HP turbine 132 or the LP turbine 134. A seal assembly located at or near a turbine inlet 170 may sometimes be referred to as a forward turbine seal. Such a forward turbine seal may be configured to contain high-pressure cooling air for the HP turbine 132 and/or the LP turbine 134, such as for turbine disks and turbine blades thereof. Additionally, or in the alternative, a seal assembly may be located at or near none or more turbine disk rims 172. A seal assembly located at or near a turbine disk rim 172 may sometimes be referred to as a turbine disk rim seal. Such a turbine disk rim seal may be configured to inhibit hot gas ingestion into the disk rim area. Additionally, or in the alternative, a seal assembly may be located between adjacent turbine stages 174 of the turbine section 126. A seal assembly located between adjacent turbine stages 174 may be sometimes referred to as a turbine interstage seal. Such a turbine interstage seal may be configured to limit air recirculation within the turbine section 126.

A seal assembly at any one or more of these locations or other location of a turbine engine 100 may be configured in accordance with the present disclosure. Additionally, or in the alternative, a turbine engine 100 may include a presently disclosed seal assembly at one or more other locations of the turbine engine 100. It will also be appreciated that the presently disclosed seal assemblies may also be used in other rotary machines, and that the turbine engine 100 described with reference to FIG. 1 is provided by way of example and not to be limiting.

Figure 2:
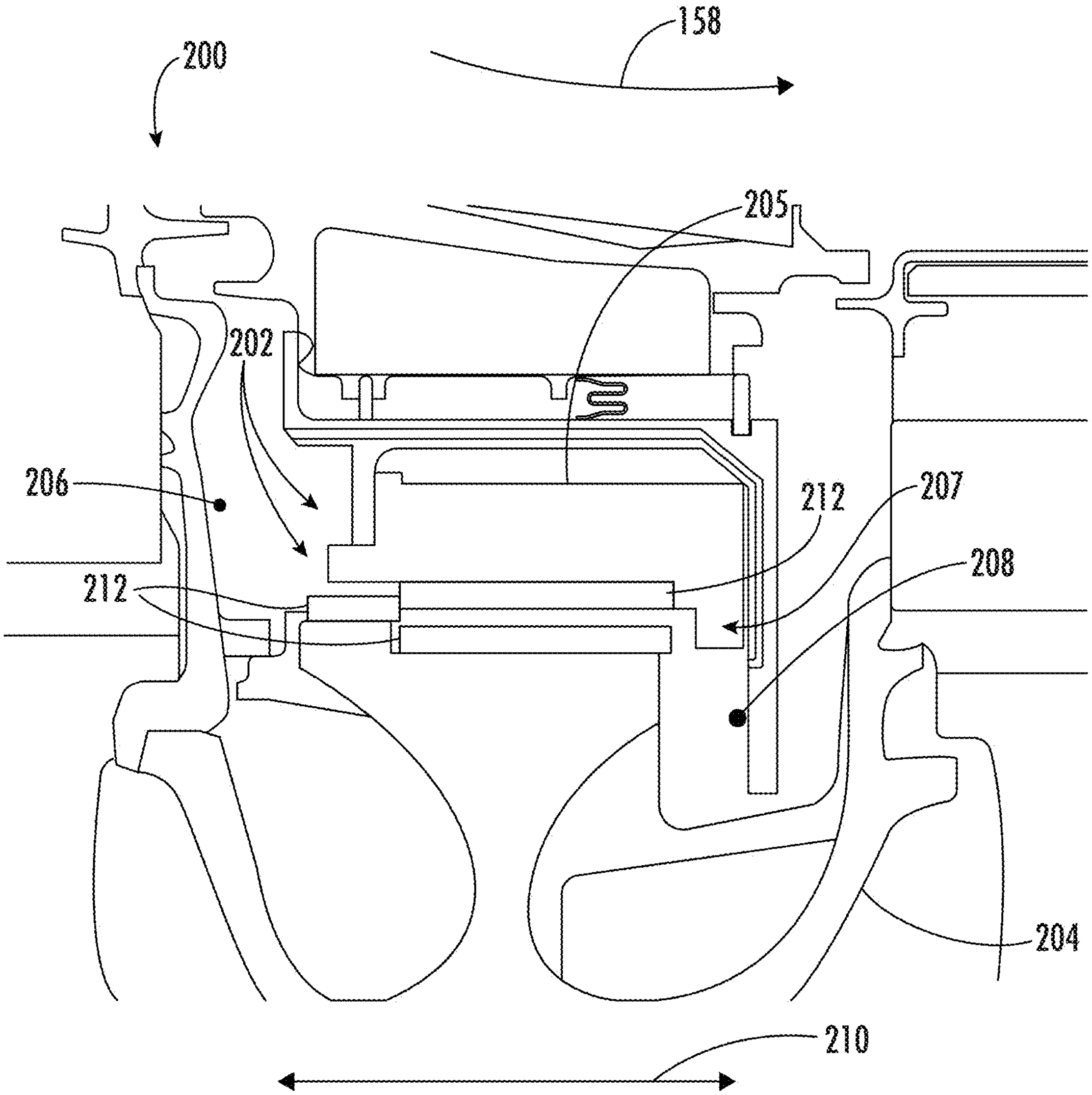
FIG. 2 shows a schematic views of an exemplary seal assembly disposed between a turbine engine rotor and a turbine engine static component.

Now referring to FIG. 2, an exemplary seal assembly is further described. As shown in FIG. 2, a rotary machine 200, such as a turbine engine 100, may include a seal assembly 202 configured to provide a sealing interface between a turbine engine rotor 204 of a rotary machine 200 and a turbine engine static component 205. The seal assembly 202 may be integrated into any rotary machine 200, such as a turbine engine 100 as described with reference to FIG. 1. As shown in FIG. 2, the seal assembly 202 may separate an inlet plenum 206 from an outlet plenum 208. The inlet plenum 206 may define a region of the rotary machine 200 that includes a relatively higher-pressure fluid volume (p_high). The inlet plenum 206 may be located at a distal position relative to an axis of rotation 210 of the rotor 204. The outlet plenum 208 may define a region of the rotary machine 200 that includes a relatively lower-pressure fluid volume (p_low). The outlet plenum 208 may be located at a proximal position relative to the axis of rotation 210 of the rotor 204. The axis of rotation 210 may coincide with and/or may extend parallel to a longitudinal axis of the rotary machine 200, such as the turbine engine 100. The seal assembly 202 may be configured as a film-riding seal that provides a non-contacting seal interface that inhibits contact between a turbine engine static component 205 and a turbine engine rotor 204, such as a fluid bearing, a gas bearing, or the like, located, for example, at an interface of the turbine engine static component 205 and the turbine engine rotor 204.

Either or both of the turbine engine static component 205 and turbine engine rotor 204 with which the seal assembly 202 can be used can take a variety of forms given the various locations discussed above that may be suitable for use of the seal assembly 202. In one embodiment, the turbine engine static component 205 can take the form of a turbine engine casing (e.g., a compressor casing, turbine casing, etc.). In an alternative and/or additional embodiment, the turbine engine rotor 204 can take the form of a turbine rotor and/or a compressor rotor. In the illustrated embodiment, a seal assembly 202 is located on each of the turbine engine static component 205 and the turbine engine rotor 204. In some embodiments, the seal assembly 202 may only be included with only one of either the turbine engine static component 205 and the turbine engine rotor 204. Furthermore, in additional and/or alternative embodiments, either or both of the turbine engine static component 205 and the turbine engine rotor 204 may include a plurality of seal assemblies 202 positioned in different locations.

The seal assembly 202 includes a seal construction 212 integrated with the turbine engine rotor 204 and the turbine engine static component 205. As suggested above, in some forms the seal construction 212 may be included with only one of either the turbine engine rotor 204 and the turbine engine static component 205. As such, one or more seal constructions 212 may be located at an interface 207 between the turbine engine rotor 204 and the turbine engine static component 205, where it will be appreciated that the 'interface' can include coupling of one or more seal constructions 212 with either or both of the turbine engine rotor 204 and the turbine engine static component 205.

Figure 3A:
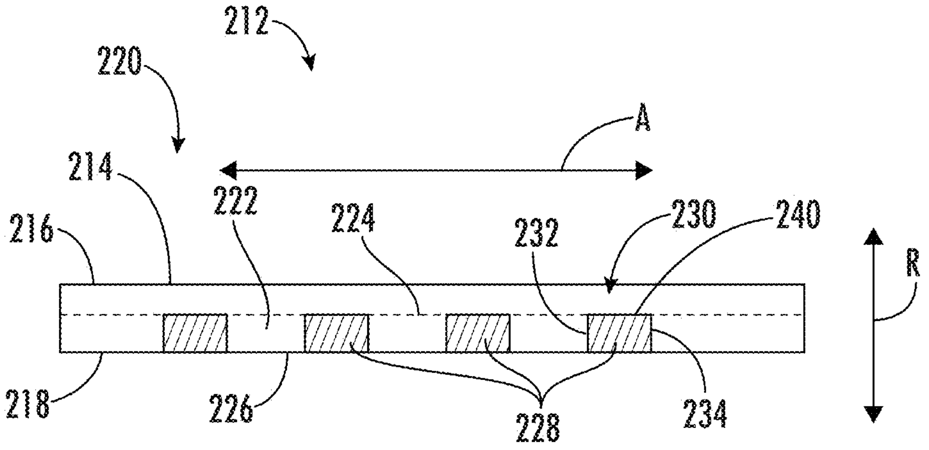
FIG. 3A shows a schematic view of an exemplary seal construction of a seal assembly at a first temperature.
Figure 3B:
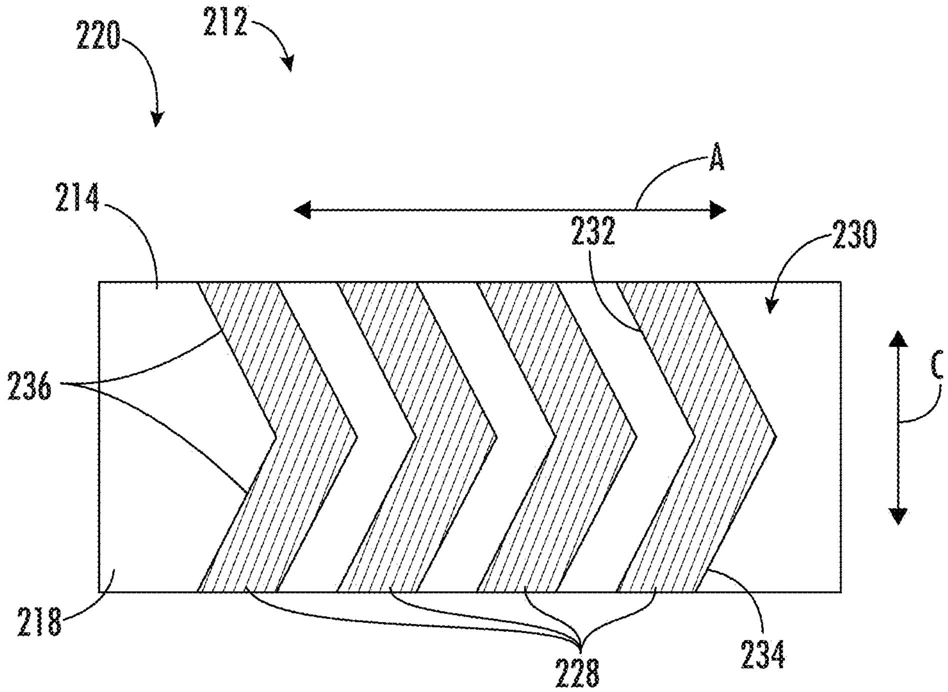
FIG. 3B shows a schematic view of an exemplary seal construction of a seal assembly at a first temperature.

Turning now to FIGS. 3A and 3B, one embodiment of the seal construction 212 is illustrated which may be included in the seal assembly 202. FIG. 3A illustrates a side view of the seal construction 212 extending in a circumferential direction C and having a thickness in the radial direction R. As will be appreciated, the circumferential direction C extends circumferentially around the annular shape of the turbine engine 100, while the radial direction R extends perpendicular to the axis of rotation 210 (illustrated in FIG. 2). The seal construction 212 includes a seal body 214 that has a thickness that extends in the radial direction between a first seal side 216 and a second seal side 218. In general, the first seal side 216 of the seal construction 212 is coupled with either the turbine engine rotor 204 or the turbine engine static component 205, depending on any given application.

The seal body 214 further includes a negative thermal expansion (NTE) layer 220 having a NTE base 222 that extends in a radial direction between a first base side 224 and a second base side 226. The NTE base 222 can be integral with the seal body 214 (e.g., it can be a monolithic material that is cast or additively printed, for example), or can be integrated with the seal body 214 through any suitable mechanism, including metallurgical bonding, chemical bonding, etc.

The NTE layer 220 includes a NTE reactive component 228 disposed in a channel 230 of the NTE base 222 defined between a first sidewall 232 and a second sidewall 234. The channel 230 can also include a sidewall bridge 240 that extends between the first sidewall 232 and second sidewall 234. Though the channel 230 is depicted as rectilinear in cross sectional shape defined by the first sidewall 232, second sidewall 234, and sidewall bridge 240, other embodiment can include different cross sectional shapes.

The NTE reactive component 228 is composed of a material having a negative thermal expansion coefficient such that the dimensions of the NTE reactive component 228 are inversely related to temperature. For example, the NTE reactive component 228 will decrease from a first size to a second size as a temperature of the NTE reactive component 228 increases from a first temperature to a second temperature. The NTE reactive component 228 can include Zirconia in one form. For example, the NTE reactive component 228 can include an alloy of Zirconia. The NTE reactive component 228 can be partially stabilized Zirconia. In one nonlimiting embodiment, the NTE reactive component 228 can be $ZrV_2O_7$. In some forms the negative thermal expansion coefficient of the NTE reactive component 228 is −10 micrometer/Kelvin. In additional and/or alternative forms, the negative thermal expansion coefficient can be any negative thermal expansion coefficient less than zero. For example, the negative thermal expansion coefficient can be anywhere in a range of −7 micrometer/Kelvin to −11 micrometer/Kelvin.

Though the embodiments of FIGS. 3A and 3B illustrate a plurality of channels 230, it will be appreciated that in some forms a single channel 230 may be provided in the NTE layer 220.

FIG. 3B illustrates a view of the seal construction 212 in the radial direction R and in which the channels 230 are depicted as neighboring channels 230 that are axially separated with respect to a neighboring channel 230. The channels 230 extend in a circumferential direction, only a portion of which is depicted in FIG. 3B. The channels 230 can take the form of a chevron shape or V-shape. In the illustrated embodiment, the channels 230 each include legs 236 that together form a piecewise linear shape in the circumferential direction. The shape of the channels 230 as viewed in the radial direction (e.g., as illustrated in FIG. 3B) can be repeated over the entirety of the circumferential extent of the seal construction 212.

Figure 4A:
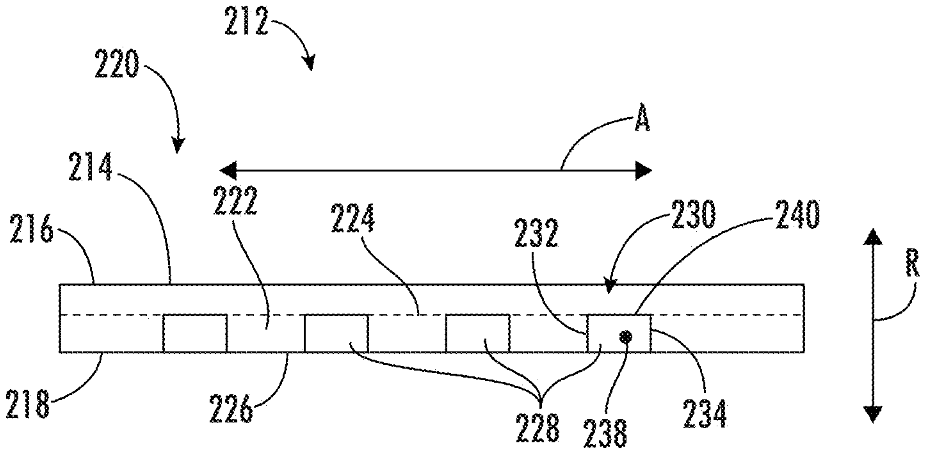
FIGS. 4A and 4B shows a schematic view of an exemplary seal construction of a seal assembly at a second temperature.
Figure 4B:
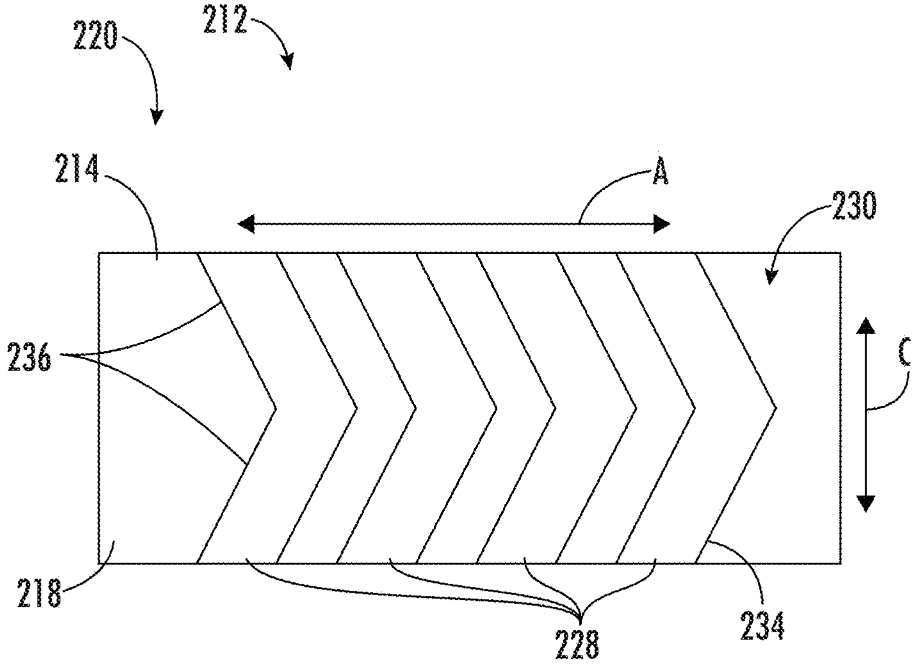

The embodiment of the NTE layer 220 depicted in FIGS. 3A and 3B is illustrated with respect to a first temperature of the NTE reactive component 228 and NTE base 222. The NTE reactive component 228 and NTE base 222 is also illustrated in FIGS. 4A and 4B at a second temperature that is higher than the first temperature in FIGS. 3A and 3B. The temperature rise from the first temperature in FIGS. 3A and 3B to the second temperature in FIGS. 4A and 4B can be caused by rubbing of the turbine engine rotor 204 against the turbine engine static component 205. It will be appreciated that rubbing between the turbine engine rotor 204 and the turbine engine static component 205 may be caused by an out-of-balance condition of the turbine engine rotor 204 and/or shaft to which the turbine engine rotor 204 is attached. The rise in temperature from the first temperature in FIGS. 3A and 3B to the second temperature in FIGS. 4A and 4B can cause the NTE layer 220, and specifically the NTE reactive component 228, to change shape.

FIG. 4A, when compared against the depiction in FIG. 3A, illustrates the effect of a rise in temperature of the NTE reactive component 228 in which the NTE reactive component 228 experiences a reduction in a dimension, specifically a reduction in depth in the illustrated embodiment, of the NTE reactive component 228 as it relates to a radial depth of channel 230. In one form, the thermal expansion coefficient of the NTE base 222 is positive which contributes to the apparent reduction in depth of the NTE reactive component 228. The reduction in depth of the NTE reactive component 228 can form a hydrodynamic pocket 238 defined between the NTE reactive component 228 and the first sidewall 232 and second sidewall 234 of the channel 230. The size of the hydrodynamic pocket 238 is dependent upon the temperature of the NTE reactive component 228 and NTE layer 220 at any given moment in time.

Formation of the hydrodynamic pocket 238 caused by a rise in temperature that results from rubbing between the turbine engine rotor 204 and turbine engine static component 205 can aid in creation of local hydrodynamic lift force. Adjustment of the hydrodynamic lift force caused by the growth and/or formation of the hydrodynamic pocket 238 can be used in balancing the rotor to an equilibrium position and thereby reduce and/or eliminate rubbing between the turbine engine rotor 204 and the turbine engine static component 205. As used with respect to the hydrodynamic pocket, the term "growth" refers to an increase in the volume of the hydrodynamic pocket.

Figure 5:
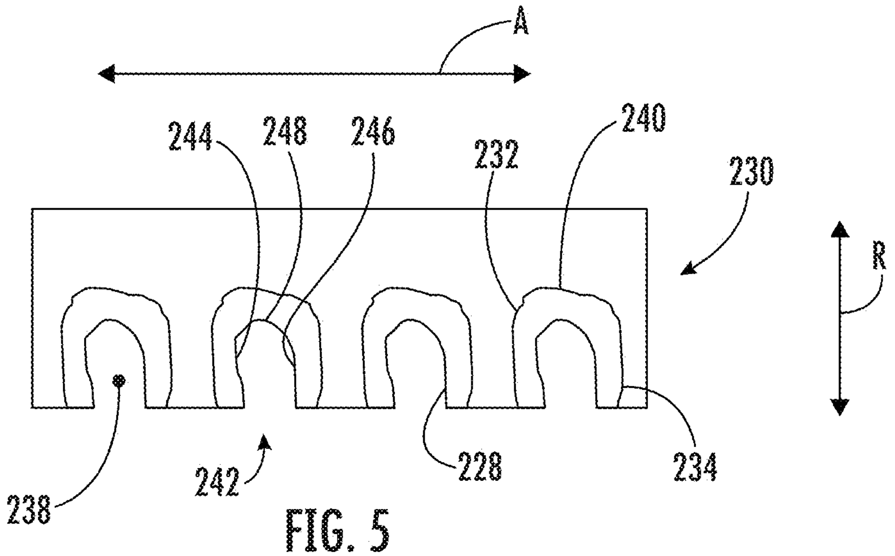
FIG. 5 shows a schematic view of a further exemplary seal construction at a first temperature.
Figure 6:
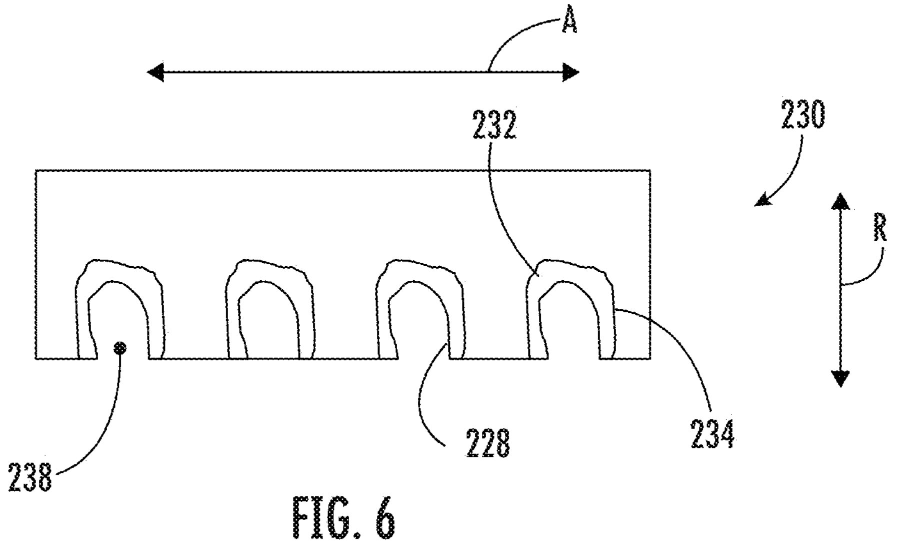
FIG. 6 shows a schematic view of the exemplary seal construction of FIG. 6 at a second temperature.

Turning now to FIGS. 5 and 6, the NTE layer 220 can take on a different cross sectional form than that depicted in FIGS. 3A and 4A. The embodiment of the channel 230 and NTE reactive component 228 depicted in FIGS. 3A and 4A are depicted as rectilinear in cross sectional shape and in which the NTE reactive component 228 has a constant radial thickness across the axial reach of the channel 230. In contrast, the NTE reactive component 228 of FIGS. 5 and 6 depict the NTE reactive component 228 having a contour in the shape of the channel 230. Such a contoured shape of the NTE reactive component 228 can result in a generally constant thickness of the NTE reactive component 228 along the first sidewall 232 and second sidewall 234 as well as a sidewall bridge 240 between the first sidewall 232 and second sidewall 234. In other forms, the contour may not be a constant thickness but nevertheless still provides a hydrodynamic pocket 238.

The contoured nature of the NTE reactive component 228 results in the formation of hydrodynamic pocket 238 which can be defined by a groove 242. The groove 242 is defined by a first groove sidewall 244 of the NTE reactive component 228, second groove sidewall 246 of the NTE reactive component 228, and a groove bridge 248 extending between the first groove sidewall 244 and second groove sidewall 246. When the NTE reactive component 228 becomes smaller as illustrated in FIG. 6 as a result of an increase from the first temperature to the second temperature, the hydrodynamic pocket 238 may also be further defined by the first sidewall 232 and second sidewall 234.

The NTE layer 220 illustrated in FIGS. 5 and 6 can include any of the axial and circumferential variations of the NTE layer 220 depicted in FIGS. 3B and 4B (e.g., the chevron shape pattern repeated along the circumferential direction of the seal construction 212).

The embodiment of FIGS. 5 and 6 also depict a hydrodynamic pocket 238 that can be formed prior to an increase in temperature. FIG. 5 depicts a relative size of the hydrodynamic pocket 238 at a first temperature of the NTE reactive component 228, while FIG. 6 depicts the hydrodynamic pocket 238 at a second temperature of the NTE reactive component 228 where the second temperature is higher than the first temperature. The first temperature depicted in FIG. 5 may correspond to a standard day temperature similar to ambient temperature conditions prior to operating the turbine engine 100. The second temperature depicted in FIG. 6 may correspond to an operating temperature of the turbine engine 100. Further, the second temperature depicted in FIG. 6 may correspond to a temperature that results from rubbing of the turbine engine rotor 204 against the turbine engine static component 205. Owing to the negative thermal expansion coefficient of the NTE reactive component 228, the hydrodynamic pocket 238 illustrated at a first temperature in FIG. 5 is bigger than the hydrodynamic pocket 238 illustrated at a higher second temperature in FIG. 6. The NTE reactive component 228 decreases in dimension (e.g., a thickness as measured against the first sidewall 232) from a first size to a second size as a temperature of the NTE reactive component 228 increases from the first temperature in FIG. 5 to the second temperature in FIG. 6. As above, the size of the hydrodynamic pocket 238 is dependent upon the temperature of the NTE reactive component 228 and NTE layer 220 at any given moment in time.

Growth of the hydrodynamic pocket 238 caused by a rise in temperature that results from rubbing between the turbine engine rotor 204 and turbine engine static component 205 can aid in creation of increased local hydrodynamic lift force. Adjustment of the hydrodynamic lift force caused by the growth of the hydrodynamic pocket 238 can be used in balancing the rotor to an equilibrium position and thereby reduce and/or eliminate rubbing between the turbine engine rotor 204 and the turbine engine static component 205.

Figure 7:
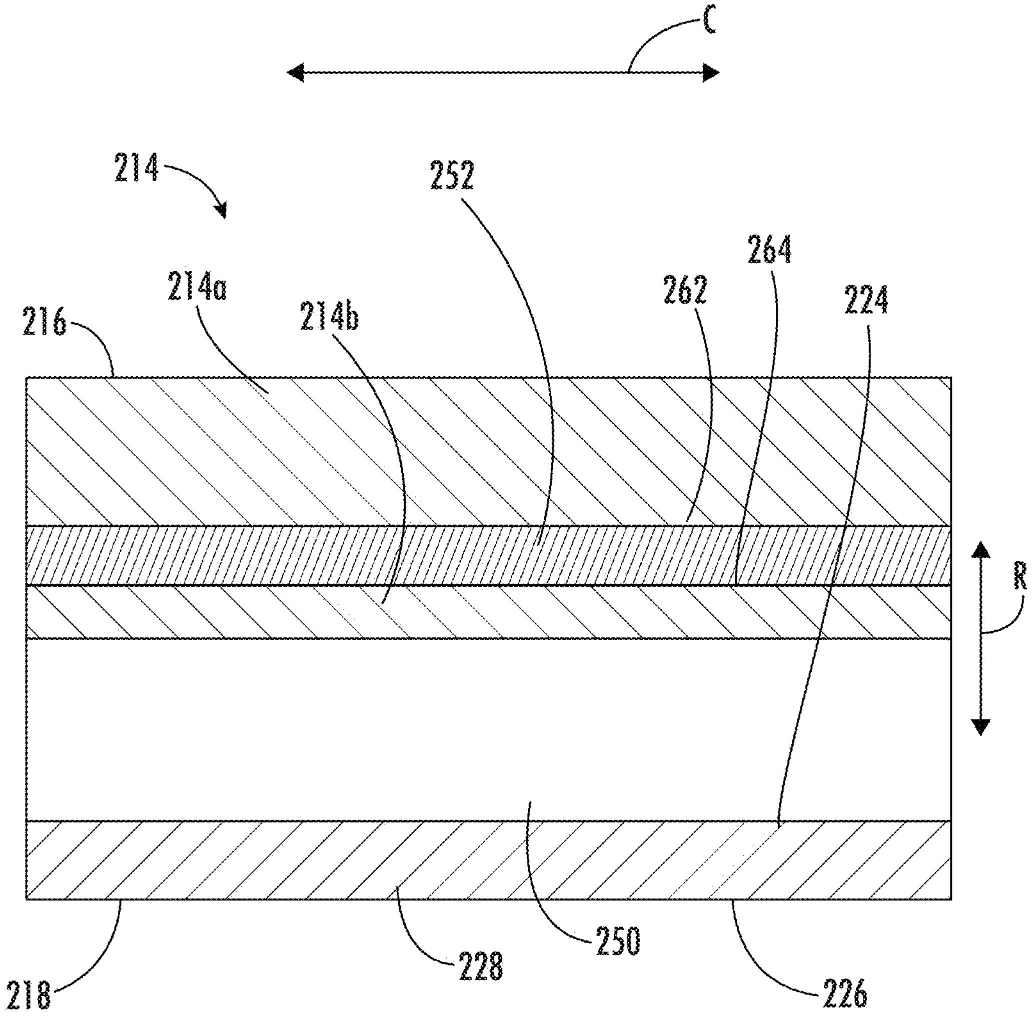
FIG. 7 shows a schematic view of a further exemplary seal construction having a lattice compliant layer.

Turning now to FIG. 7, another embodiment of the seal construction 212 is depicted which further includes a wear resistant base layer 250 coupled between the first seal side 216 and the NTE layer 220. The wear resistant base layer 250 can be composed of a material that resists wear that results from contact with a relatively moving part. For example, if the seal construction depicted in FIG. 7 were coupled with the turbine engine rotor 204, the wear resistant base layer 250 can include a material that resists wear when the seal construction rubs against the turbine engine static component 205. The wear resistant base layer 250 can be composed of a material such as chromium nitride, or titanium nitride. In some embodiments, the wear resistant base layer 250 can be integral with the NTE base 222. For example, the wear resistant base layer 250 can be made of the same material and formed at the same time as the NTE base 222. In other embodiments, the wear resistant base layer 250 can be integrated with the NTE base 222 such as through any suitable joining operation (e.g., metallurgical bonding, chemical bonding, mechanical fastening, etc.). In some embodiments, the wear resistant base layer 250 can function as a bond coat and manage thermal mismatch between the NTE layer 220 and seal body 214. The NTE layer 220 of FIG. 7 can include any of the variations of the NTE later 220 discussed above, including the variations discussed with respect to FIGS. 3A-6.

It will be appreciated that the seal body 214 depicted in FIG. 7 can include channels 230 and NTE reactive components 228 formed according to any of the embodiments depicted above with respect to FIGS. 3A-6.

Of note, the embodiment of FIG. 7 further includes a lattice compliant layer 252 disposed between a first seal body 214*a* and a second seal body 214*b* (collectively, a "seal body 214"). In the illustrated embodiment, the first seal body 214*a* can have a radial thickness larger than a radial thickness of the second seal body 214*b*. Other embodiments may include the same radial thickness of the first seal body 214*a* and second seal body 214*b*, or may include a second seal body 214*b* having greater radial thickness than a radial thickness of the first seal body 214*a*.

The lattice compliant layer 252 radially extends between a first compliant layer side 262 and a second compliant layer side 264. The lattice compliant layer 252 is configured to provide additional structural compliance to the seal body 214 relative to a seal body 214 which is monolithic or otherwise lacks the lattice compliant layer 252. The additional compliance present in a seal body 214 which includes the lattice compliant layer 252 improves durability and performance of the seal construction 212 by providing flexibility of the seal construction 212 when the turbine engine rotor 204 and turbine engine static component 205 come into contact. Such contact can be a circumferential rubbing as described above, but can also include axial contact such as can be induced by thrust forces along the axial direction A during operation of the turbine engine 100. The lattice compliant layer 252 can provide an axially dependent compliance. For example, in some forms the lattice compliant layer 252 can provide an axial compliance, radial compliance, and circumferential compliance which vary from one another. The lattice compliant layer 252 can be made integral with the first seal body 214*a* and second seal body 214*b* such as through additive manufacturing.

Figure 8:
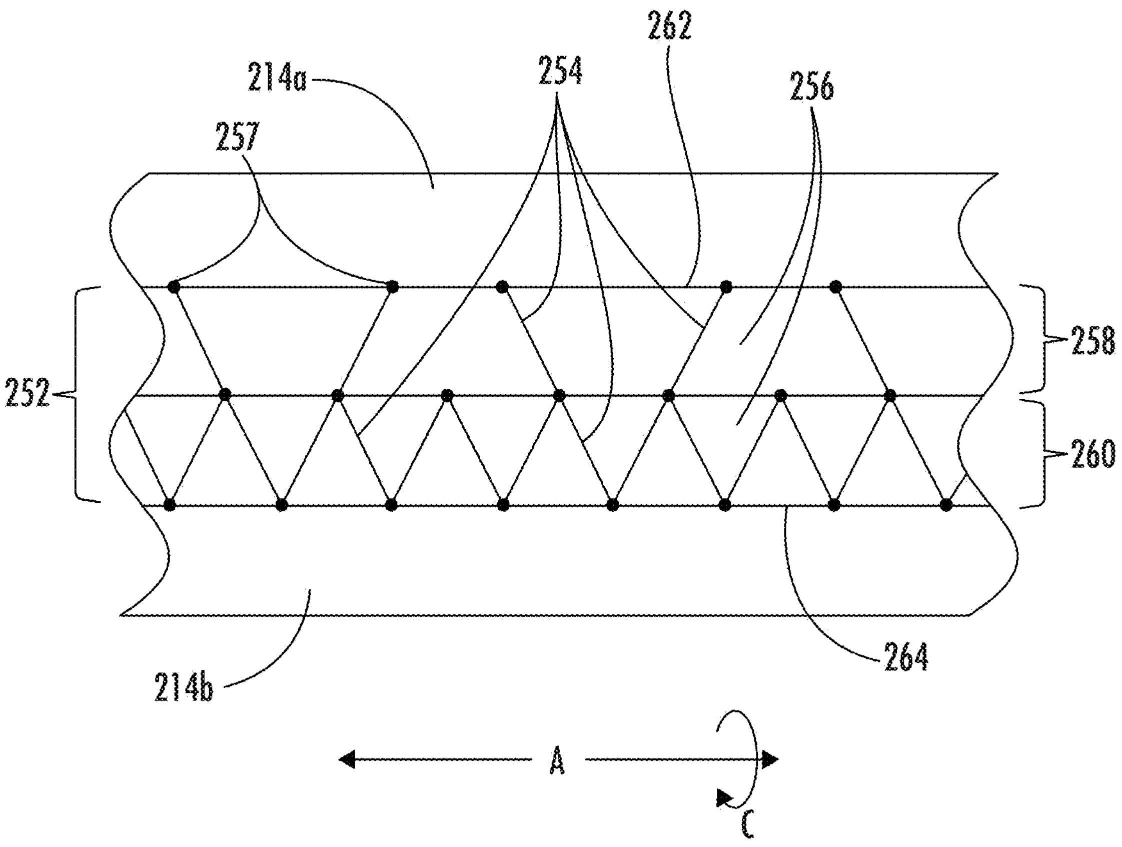
FIG. 8 shows a schematic view of a further exemplary seal construction having a lattice compliant layer.

Turning now to FIG. 8, and with continued reference to FIG. 7, an embodiment of the lattice compliant layer 252 is illustrated. The lattice compliant layer 252 includes a plurality of lattice ligaments 254, depicted as straight lines in FIG. 8, which together define a plurality of cavities 256. The lattice ligaments 254 can extend between nodes 257 depicted as dots in FIG. 8. Though the lattice ligaments 254 and nodes 257 are depicted as straight lines and dots, it will be appreciated that such depictions are intended for ease of reference and are not intended to imply the only configurations. For example, lattice ligaments 254 can take on curvilinear and/or discontinuous shapes. Further, the nodes 257 may merely be a union between intersecting lattice ligaments 254, or between an intersecting lattice ligament 254 with one or the other of the first compliant layer side 262 and second compliant layer side 264, whether or not such union forms the shape of a dot as depicted.

Depending upon the application, the lattice compliant layer 252, and specifically the cavities 256, can be oriented in any particular direction. The depiction in FIG. 8 illustrates cavities 256 bounded on an axially forward side and axially aft side by neighboring, non-intersecting ligaments 254. The cavities 256 can also be bounded radially by either a ligament 254 which is located between a first lattice layer 258 and a second lattice layer 260, or by one or the other of the first compliant layer side 262 and second compliant layer side 264. It will be appreciated that the cavities 256 can extend in the circumferential direction in the illustrated embodiment. In other embodiments, the cavities 256 can be oriented to extend in the radial direction, while in still further embodiments the cavities 256 can be oriented to extend in the axial direction.

The cavities 256 depicted in FIG. 8 are arranged in the first lattice layer 258 are radially offset from the second lattice layer 260. The first lattice layer 258 includes a plurality of cavities 256 defined by ligaments 254 and first compliant layer side 262 in the shape of a trapezoid (e.g., a trapezoidal shape), while the second lattice layer 260 includes a plurality of cavities 256 defined by ligaments 254 and second compliant layer side 264 in the shape of a triangle (e.g., a triangular shape). The difference in ligament arrangement in the first lattice layer 258 as compared to the ligament arrangement in the second lattice layer 260, and therefore a difference in shape of the cavities 256, can provide for a difference in compliance between the first lattice layer 258 and second lattice layer 260. A compliance of the lattice compliant layer 252 can therefore be tuned to provide variable compliance through a thickness of the lattice compliant layer 252 between the first seal body 214*a* and second seal body 214*b*. In one form, the compliance of the first lattice layer 258 is greater than the compliance of the second lattice layer 260 to provide for greater deflection under load of the first lattice layer 258.

Figure 9:
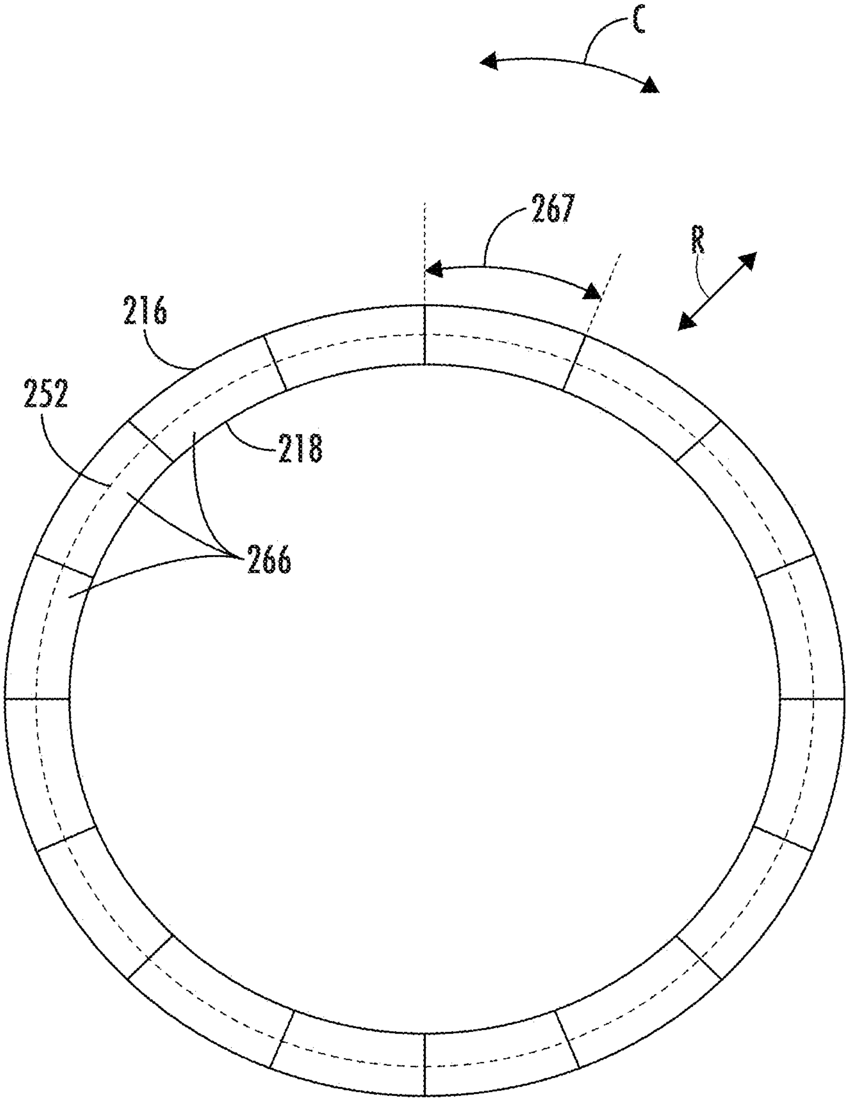
FIG. 9 shows a schematic view of an annular arrangement of a plurality of segments of an exemplary seal construction.

Turning now to FIG. 9, a circumferential arrangement of a plurality of segments 266 of the seal construction 212 is depicted. The arrangement in FIG. 8 is viewed along the axial direction. In sum, a total of twelve different segments 266 are depicted and in which each segment 266 defines an arc 267 that extends in a circumferential direction. Features within the seal construction 212, therefore, can also be defined by the arc 267. For example, the cavities 256 can be arranged to extend circumferentially along the segment 266. When assembled together, the totality of the circumferential arc forms an annular shape.

Figure 10:
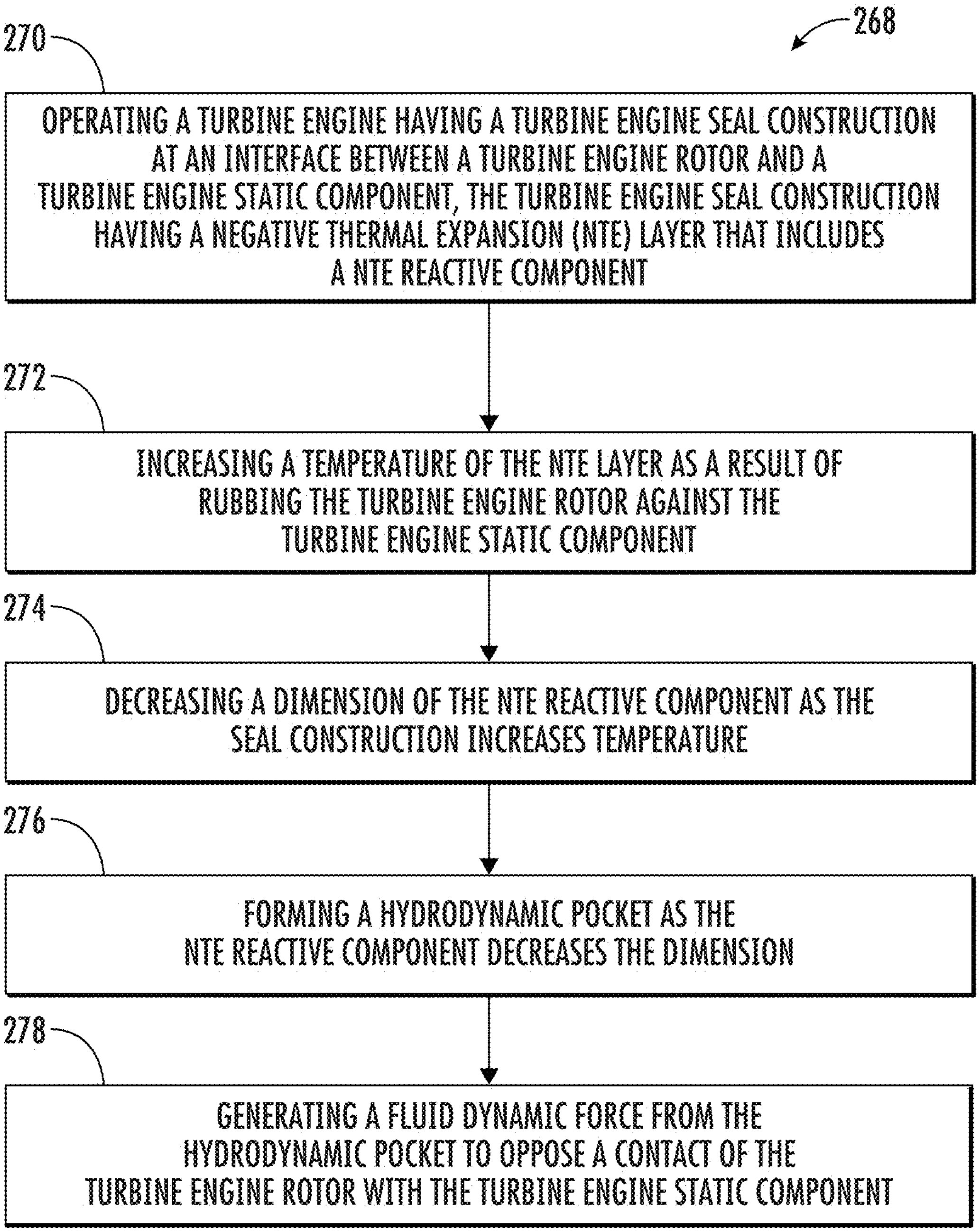
FIG. 10 shows a method of operating a turbine engine having a seal construction.

Now referring to FIG. 10, an exemplary method of operating a turbine engine seal is described. In some embodiments, the seal construction 212 can be coupled with either or both of the turbine engine rotor 204 and the turbine engine static component 205. As shown in FIG. 10, an exemplary method 268 of operating a turbine engine seal can include, at step 270, operating a turbine engine 100 having a seal construction 212 at an interface 207 between a turbine engine rotor 204 and a turbine engine static component 205, the turbine engine seal construction 212 having a NTE layer 220 that includes a NTE reactive component 228. The NTE reactive component 228 can be located in a channel 230 formed in the NTE layer 220, where the channel 230 can extend circumferentially. The method of operating may include, at step 272, increasing a temperature of the NTE layer 220 as a result of rubbing the turbine engine rotor 204 against the turbine engine static component 205. The rubbing may be the result of an out-of-balance condition of the turbine engine rotor 204 and/or movement of a rotational axis of the turbine engine rotor 204. At step 274, the method may further include decreasing a dimension of the NTE reactive component 228 as the seal construction 212 increases temperature. The method of operating may further include, at step 276, forming a hydrodynamic pocket 238 as the NTE reactive component 228 decreases the dimension. Such formation of the hydrodynamic pocket 238 can be either the creation of the hydrodynamic pocket 238 if an original configuration at the first temperature did not provide for the hydrodynamic pocket 238, or a growth of an existing hydrodynamic pocket 238 if the original configuration at the second temperature already provided for the hydrodynamic pocket 238. At step 278, the method can further include generating a fluid dynamic force from the hydrodynamic pocket 238 to oppose a contact of the turbine engine rotor 204 with the turbine engine static component 205. The formation of the hydrodynamic pocket 238 can include forming the hydrodynamic pocket that extends circumferentially along the NTE layer 220. The forming at step 272 can further include increasing a volume of the hydrodynamic pocket 238 from a first pocket size to a second pocket size as the NTE layer increases in temperature from a first temperature to a second temperature.

Figure 11:
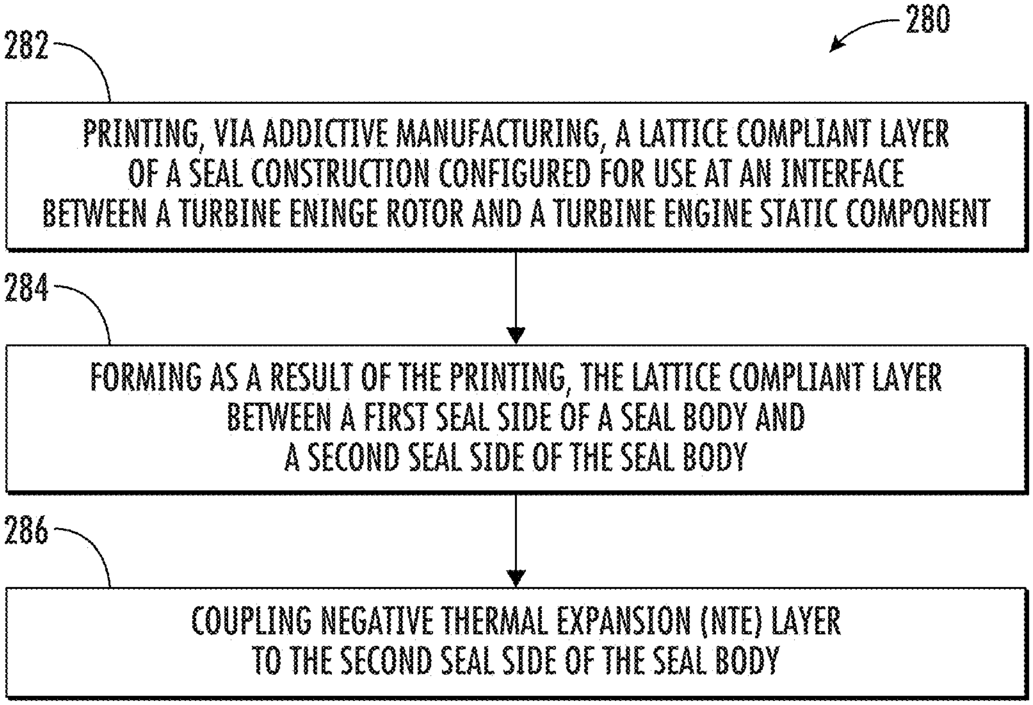
FIG. 11 shows a method of making a seal construction having a lattice compliant layer.

Now referring to FIG. 11, an exemplary method of manufacturing a turbine engine seal is described. In some embodiments, one or more portions of the turbine engine seal can be manufactured using an additive manufacturing technology. Additionally, or in the alternative, one or more portions of the turbine engine seal may be additively manufactured using other technologies, such as casting, forging, machining, extrusion, and so forth. As shown in FIG. 11, an exemplary method 280 of manufacturing a turbine engine seal may include, at block 282, printing, via additive manufacturing, a lattice compliant layer 252 of a seal construction 212 configured for use at an interface 207 between a turbine engine rotor 204 and a turbine engine static component 205. At step 284, the method 280 further includes forming, as a result of the printing, the lattice compliant layer 252 between a first seal side 216 of a seal body 214 and a second seal side 218 of the seal body 214. The lattice compliant layer 252 can have a structural compliance that varies with a thickness of the lattice compliant layer 252 between the first seal side 216 and second seal side 218. The method 280 may further include coupling a negative thermal expansion (NTE) layer 220 to the second seal side 218 of the seal body 214 at step 286. The NTE layer 220 may include a NTE reactive component 228 that is composed of a material having a negative thermal expansion coefficient. The NTE reactive component 228 can decrease in dimension from a first size to a second size as a temperature increases from a first temperature to a second temperature. The method 280 can further include forming a plurality of ligaments 254 of the lattice compliant layer 252. The ligaments 254, in conjunction with either of a first compliant layer side 262 and second compliant layer side 264, can form a plurality of cavities 256.

Further aspects of the presently disclosed subject matter are provided by the following clauses:

A turbine engine seal, comprising: a seal construction configured to be positioned between a turbine engine rotor and a turbine engine static component, the seal construction comprising: a seal body having a thickness that extends in a radial direction between a first seal side and a second seal side; and a negative thermal expansion (NTE) layer disposed on the second seal side configured to react to a change in temperature, the NTE layer including a NTE reactive component comprising a material having a negative thermal expansion coefficient.

The turbine engine seal of the preceding clause, wherein the NTE layer further comprising a NTE base that extends in the radial direction between a first base side and a second base side, the NTE base comprising a material having a different thermal expansion coefficient than the NTE reactive component, the NTE base having a channel, and wherein the NTE reactive component is disposed in the channel.

The turbine engine seal of any of the preceding clauses, wherein the channel of the NTE base includes a plurality of channels, wherein the NTE reactive component includes a plurality of NTE reactive components, and wherein each channel of the plurality of channels including a respective NTE reactive component of the plurality of NTE reactive components, and wherein the plurality of channels are dispersed circumferentially along an arc of the NTE base.

The turbine engine seal of any of the preceding clauses, wherein the channel extends in a piecewise linear configuration along an arc of the NTE base.

The turbine engine seal of any of the preceding clauses, the channel extends as a repeating chevron shape along an arc of the NTE base.

The turbine engine seal of any of the preceding clauses, wherein the channel includes a first sidewall and a second sidewall, the first sidewall opposing the second sidewall.

The turbine engine seal of any of the preceding clauses, wherein during operation of the seal construction, an increase in a temperature of the NTE reactive component causes the NTE reactive component to decrease in size from a first size to a second size, wherein the decrease in size of the NTE reactive component increases a size of a hydrodynamic pocket formed between the first sidewall and the second sidewall.

The turbine engine seal of any of the preceding clauses, wherein the NTE layer defines a groove having a first groove sidewall and a second groove sidewall, and wherein a hydrodynamic pocket is formed between the first groove sidewall and the second groove sidewall.

The turbine engine seal of any of the preceding clauses, wherein the hydrodynamic pocket extends circumferentially along an arc of the NTE base.

The turbine engine seal of any of the preceding clauses, wherein the hydrodynamic pocket extends circumferentially in a shape of a chevron.

The turbine engine seal of any of the preceding clauses, further comprising a wear resistant base layer coupled between the first seal side and the NTE layer.

A rotary machine, comprising: a turbine engine rotor of a turbine engine having a negative thermal expansion (NTE) layer configured to dimensionally react when the NTE layer experiences a rise in temperature from a first temperature to a second temperature, the NTE layer defining at least part of a hydrodynamic pocket formed at the second temperature of the NTE layer.

The rotary machine of the preceding clause, wherein the NTE layer further comprising a NTE base having a thickness that extends in a radial direction between a first base side and a second base side, the NTE base having a channel, and wherein the channel extends partially into the thickness of the NTE layer.

The rotary machine of any of the preceding clauses, wherein the channel includes a first sidewall, a second sidewall, and sidewall bridge extending between the first sidewall and second sidewall, wherein the first sidewall is located opposite the second sidewall, and wherein an NTE reactive component is disposed in the channel.

The rotary machine of any of the preceding clauses, wherein the NTE reactive component is contoured along the first sidewall, the second sidewall, and a sidewall bridge.

The rotary machine of any of the preceding clauses, wherein the NTE reactive component is disposed as a constant thickness along each of the first sidewall, the second sidewall, and the sidewall bridge.

The rotary machine of any of the preceding clauses, wherein the seal body further includes a lattice compliant layer disposed within the seal body between a first seal body side and a second seal body side.

The rotary machine of any of the preceding clauses, wherein the lattice compliant layer includes a plurality of lattice ligaments each extending between adjacent nodes of a plurality of nodes.

The rotary machine of any of the preceding clauses, wherein the lattice compliant layer includes a plurality of cavities defined by the plurality of lattice ligaments.

The rotary machine of any of the preceding clauses, wherein the plurality of cavities includes a first lattice layer and a second lattice layer, the first lattice layer located radially offset from the second lattice layer.

The rotary machine of any of the preceding clauses, wherein the first lattice layer including a plurality of cavities having a trapezoidal shape.

The rotary machine of any of the preceding clauses, wherein the first lattice layer including a plurality of cavities having a triangular shape.

The rotary machine of any of the preceding clauses, wherein the lattice compliant layer has a first compliance along an axial direction at the first seal body side of the seal body and a second compliance along the axial direction at the second seal body side of the seal body.

The rotary machine of any of the preceding clauses, wherein the seal body includes a plurality of layers including the lattice compliant layer.

The rotary machine of any of the preceding clauses, the plurality of layers includes a first seal body and a second seal body, wherein the lattice compliant layer is positioned between the first seal body and second seal body.

The rotary machine of any of the preceding clauses, wherein the first seal body having a radial thickness that is greater than a radial thickness of the second seal body.

The rotary machine of any of the preceding clauses, wherein the lattice compliant layer is an integral component including a monolithic construction between a first compliant layer side and a second compliant layer side.

The rotary machine of any of the preceding clauses, further comprising a wear resistant base layer coupled to the second seal body side of the seal body, wherein the wear resistant base layer has a thickness that extends in the radial direction from a first wear resistant side to a second wear resistant side, the first wear resistant side coupled to the second seal body side of the seal body, and wherein the second wear resistant side includes a plurality of channels that extend partially into the thickness of the wear resistant base layer.

The rotary machine of any of the preceding clauses, wherein the plurality of channels each include a first channel sidewall and a second channel sidewall, the first channel sidewall opposing the second channel sidewall, and further comprising a negative thermal expansion (NTE) reactive component disposed in the plurality of channels and affixed to each of the first channel sidewall and the second channel sidewall.

The rotary machine of any of the preceding clauses, wherein the NTE reactive component is composed of a material having a negative thermal expansion coefficient.

The rotary machine of any of the preceding clauses, wherein the NTE reactive component defines a groove having a first groove sidewall and a second groove sidewall, and wherein a hydrodynamic pocket is formed between the first groove sidewall and the second groove sidewall.

The rotary machine of any of the preceding clauses, wherein the hydrodynamic pocket extends circumferentially along an arc of the wear resistant base layer.

The rotary machine of any of the preceding clauses, wherein the hydrodynamic pocket extends circumferentially in a shape of a chevron.

A method of operating a turbine engine seal, comprising: operating a turbine engine having a seal construction at an interface between a turbine engine rotor and a turbine engine static component, the seal construction having a negative thermal expansion (NTE) layer that includes a NTE reactive component; increasing a temperature of the NTE layer from a first temperature to a second temperature as a result of rubbing the turbine engine rotor against the turbine engine static component; decreasing a dimension of the NTE reactive component as the seal construction increases temperature; forming a hydrodynamic pocket as the NTE reactive component decreases the dimension; and generating a fluid dynamic force from the hydrodynamic pocket to oppose a contact of the turbine engine rotor with the turbine engine static component.

The method of the preceding clause, wherein forming the hydrodynamic pocket further comprises forming the hydrodynamic pocket that extends circumferentially along the NTE layer.

The method of any of the preceding clauses, wherein the NTE reactive component includes a plurality of NTE reactive components.

The method of any of the preceding clauses, wherein the forming further comprises increasing a volume of the hydrodynamic pocket from a first pocket size to a second pocket size as the NTE layer increases from the first temperature to the second temperature.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine engine seal, comprising: a seal construction configured to be positioned between a turbine engine rotor and a turbine engine static component, the seal construction comprising: a seal body having a thickness that extends in a radial direction between a first seal side and a second seal side; and a negative thermal expansion (NTE) layer disposed on the second seal side, the NTE layer configured to react to a change in temperature and including a NTE reactive component comprising a material having a negative thermal expansion coefficient; and wherein the seal body further includes a lattice compliant layer disposed within the first seal side and a second seal side.

2. The turbine engine seal of claim 1, the NTE layer further comprising a NTE base that extends in the radial direction between a first base side and a second base side, the NTE base comprising a material having a different thermal expansion coefficient than the NTE reactive component, the NTE base having a channel, wherein the NTE reactive component is disposed in the channel.

3. The turbine engine seal of claim 2, wherein the channel of the NTE base includes a plurality of channels, wherein the NTE reactive component includes a plurality of NTE reactive components, and wherein each channel of the plurality of channels including a respective NTE reactive component of the plurality of NTE reactive components, and wherein the plurality of channels are dispersed circumferentially along an arc of the NTE base.

4. The turbine engine seal of claim 2, wherein the channel extends in a piecewise linear configuration along an arc of the NTE base.

5. The turbine engine seal of claim 2, wherein the channel extends as a repeating chevron shape along an arc of the NTE base.

6. The turbine engine seal of claim 2, wherein the channel includes a first sidewall and a second sidewall, the first sidewall opposing the second sidewall.

7. The turbine engine seal of claim 6, wherein during operation of the seal construction, an increase in a temperature of the NTE reactive component causes the NTE reactive component to decrease in size from a first size to a second size, wherein the decrease in size of the NTE reactive component increases a size of a hydrodynamic pocket formed between the first sidewall and the second sidewall.

8. The turbine engine seal of claim 1, wherein the NTE layer defines a groove having a first groove sidewall and a second groove sidewall, and wherein a hydrodynamic pocket is formed between the first groove sidewall and the second groove sidewall.

9. The turbine engine seal of claim 8, wherein the hydrodynamic pocket extends circumferentially along an arc of an NTE base.

10. The turbine engine seal of claim 8, wherein the hydrodynamic pocket extends circumferentially in a shape of a chevron.

11. The turbine engine seal of claim 1, further comprising a wear resistant base layer coupled between the first seal side and the NTE layer.

12. A rotary machine, comprising: a turbine engine rotor of a turbine engine having a negative thermal expansion (NTE) layer configured to dimensionally react when the NTE layer experiences a rise in temperature from a first temperature to a second temperature, the NTE layer defining at least part of a hydrodynamic pocket formed at the second temperature of the NTE layer; and wherein a seal body further includes a lattice compliant layer disposed within the seal body between a first seal body side and a second seal body side.

13. The rotary machine of claim 12, the NTE layer further comprising a NTE base having a thickness that extends in a radial direction between a first base side and a second base side, the NTE base having a channel, wherein the channel extends partially into the thickness of the NTE layer.

14. The rotary machine of claim 13, wherein the channel includes a first sidewall, a second sidewall, and a sidewall bridge extending between the first sidewall and the second sidewall, wherein the first sidewall is located opposite the second sidewall, and wherein an NTE reactive component is disposed in the channel.

15. The rotary machine of claim 14, wherein the NTE reactive component is contoured along the first sidewall, the second sidewall, and the sidewall bridge.

16. The rotary machine of claim 14, wherein the NTE reactive component is disposed as a constant thickness along each of the first sidewall, the second sidewall, and the sidewall bridge.

17. The rotary machine of claim 12, wherein the lattice compliant layer includes a plurality of lattice ligaments each extending between adjacent nodes of a plurality of nodes.

18. The rotary machine of claim 17, wherein the lattice compliant layer includes a plurality of cavities defined by the plurality of lattice ligaments.

19. The rotary machine of claim 18, wherein the plurality of cavities includes a first lattice layer and a second lattice layer, the first lattice layer located radially offset from the second lattice layer.

* * * * *